(12) United States Patent
Heath

(10) Patent No.: US 6,971,150 B1
(45) Date of Patent: Dec. 6, 2005

(54) METHOD OF POSITIONING A SEAL IN A GROOVE OF A BORE IN A HOUSING

(75) Inventor: Ryan Heath, Hendersonville, TN (US)

(73) Assignee: Robert Bosch GmbH, Stuttgart (DE)

( * ) Notice: Subject to any disclaimer, the term of this patent is extended or adjusted under 35 U.S.C. 154(b) by 190 days.

(21) Appl. No.: 10/707,094

(22) Filed: Nov. 20, 2003

(51) Int. Cl.[7] .................. B23P 11/02; B23P 19/02
(52) U.S. Cl. ........................ 29/451; 29/235
(58) Field of Search .................. 29/451, 450, 446, 29/428, 464, 466, 468, 469, 229, 235; 277/312, 277/315

(56) References Cited

U.S. PATENT DOCUMENTS 1,268,992 A * 6/1918 Bryan .................. 171/99
4,091,521 A * 5/1978 Dygert .................. 29/451

* cited by examiner

Primary Examiner—John C. Hong
(74) Attorney, Agent, or Firm—Leo H. McCormick, Jr.; Warren Comstock

(57) ABSTRACT

A method of positioning a seal in a groove of a bore in a housing comprising the steps of: placing a cylindrical seal on a plurality of projections that extend from a cylindrical body; radially moving at least one of the projections to deforming the cylindrical seal into a C-shape; inserting the cylindrical body into the bore until in the deformed cylindrical seal is in radial alignment with the groove; and axially retracting at least the one projection to allow the cylindrical seal to radially expand from the C-shape to a circular shape and fill the groove to complete its placement in the housing.

8 Claims, 3 Drawing Sheets

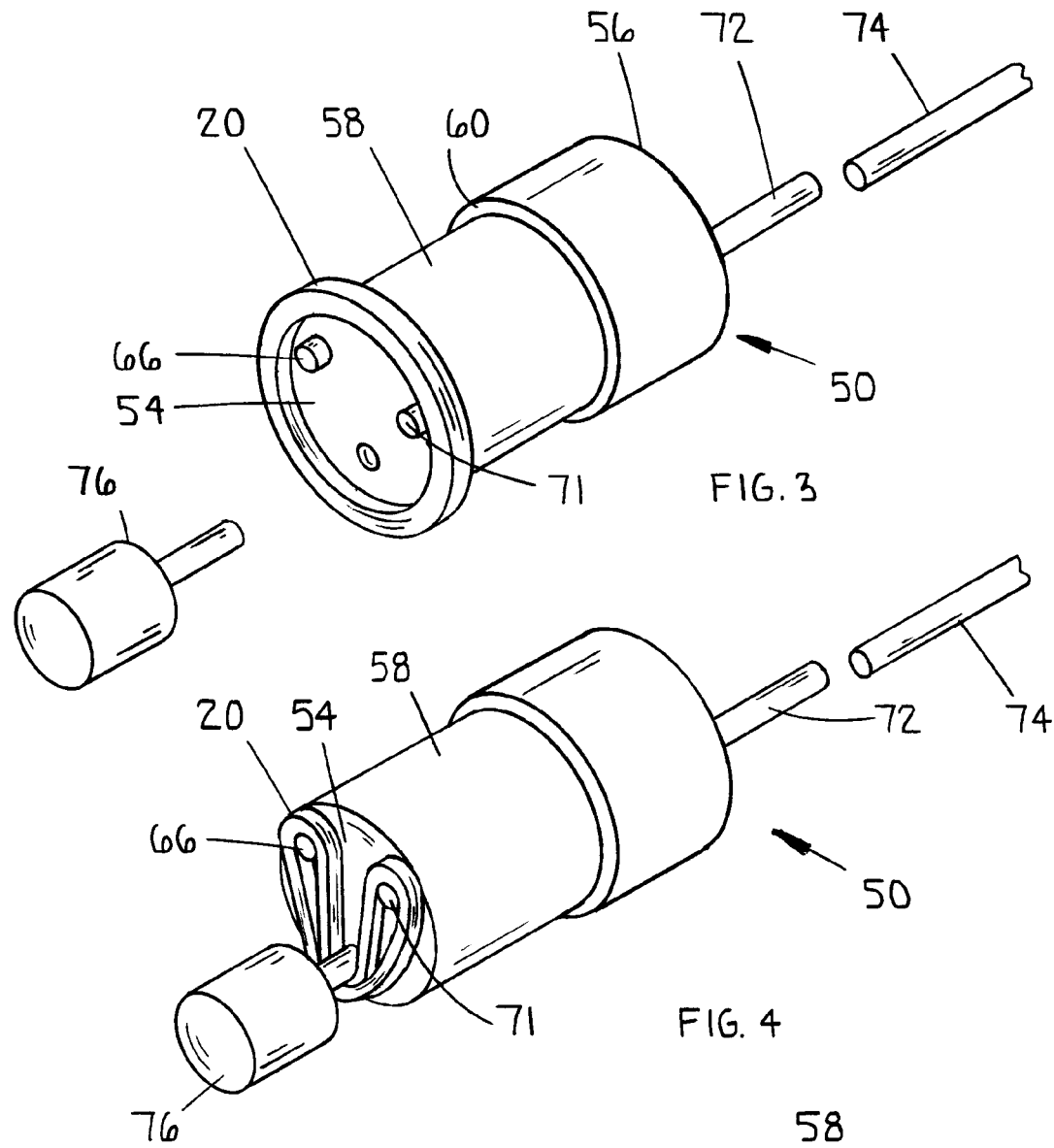
FIG. 3
FIG. 4
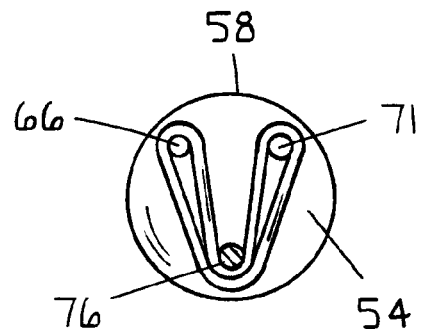
FIG. 5

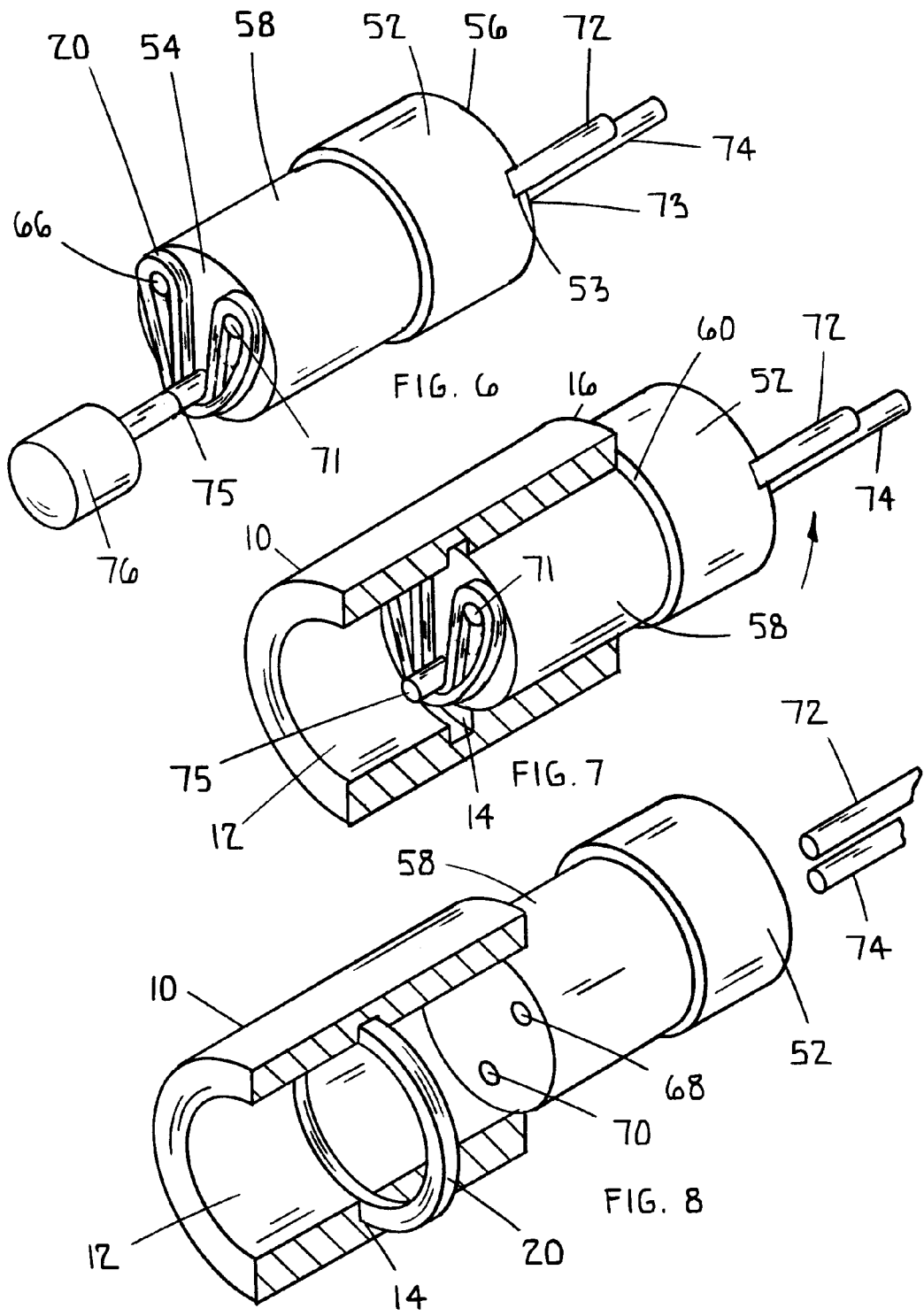

METHOD OF POSITIONING A SEAL IN A GROOVE OF A BORE IN A HOUSING

BACKGROUND OF INVENTION

This invention relates to a method of locating a seal in a groove in a bore of a housing.

In many applications wherein pistons are used to pressurize fluid in bores it is necessary to provide seals to prevent fluid from moving past the piston and rather that being communicated to a system. Most often the piston has grooves therein for retention of seals and the bore in a housing has a smooth surface for its entire depth. It has been suggested that it may be beneficial to reverse the sequence with the grooves being located in the housing and the pistons being made smooth. When this type structure is employed it can be difficult to install a seal within a groove that is located a substantial distance from the end a bore without twisting the seal. If a seal is twisted and a piston is installed it is possible to damage the seal that would need to be replaced and as a result considerable extra time and effort is required to manufacture a product.

SUMMARY OF INVENTION

It is a primary object of this invention to provide a method of locating a seal in a groove of a bore in a housing without damage to a sealing surface during installation.

According to this invention, a cylindrical seal is placed on a plurality of projections that extend from a cylindrical body of a fixture; the cylindrical seal is deformed into a C-shape and at least one of the projections is repositioned to hold the cylindrical seal in the deforming C-shape; the cylindrical body with the deformed cylindrical seal is inserted into the bore until in the deformed cylindrical seal is in radial alignment with the groove; and at least one of the projections is retracted to allow the cylindrical seal to radially expand from the C-shape to a circular shape and fill the groove to complete its placement in the housing.

An advantage of this invention resides an ability to position a seal in a groove within a bore of a housing without placing a twisting moment on the seal during installation.

A further object of this invention relates to a capability of positioning a seal in a groove within a bore of a housing without twisting independent of the location of the groove from an end face of the housing.

BRIEF DESCRIPTION OF DRAWINGS

FIG. 3 is a perspective view illustrating a first step in locating the seal on the tool of FIG. 2;

FIG. 4 is a perspective view illustrating a second step in locating the seal on the tool of FIG. 2;

FIG. 5 is a view taken along lines 5—5 of FIG. 4;

FIG. 6 is a perspective view illustrating a third step in locating the seal on the tool of FIG. 2;

FIG. 7 is a perspective sectional view of the tool of FIG. 6 on inserted in the bore of the cylindrical body of FIG. 1; and FIG. 8 is a perspective sectional view of the housing of FIG. 1 with a seal inserted in the groove.

DETAILED DESCRIPTION

Figure 1:
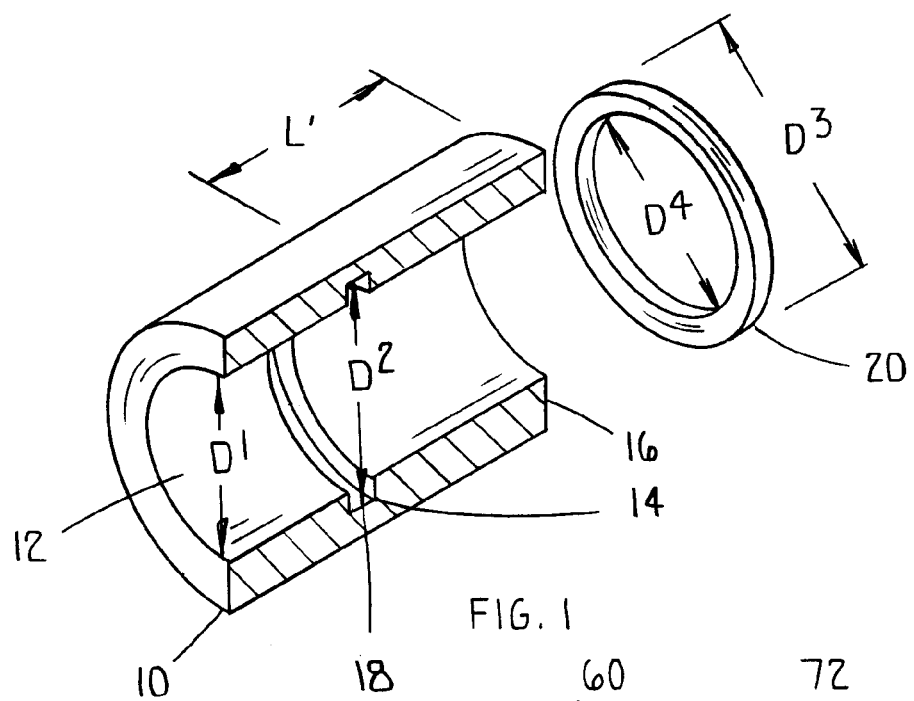
FIG. 1 is a perspective sectional view of a housing having a cylindrical bore with a groove therein for receiving a seal having an internal diameter that is smaller than the diameter of a bore.
Figure 2:
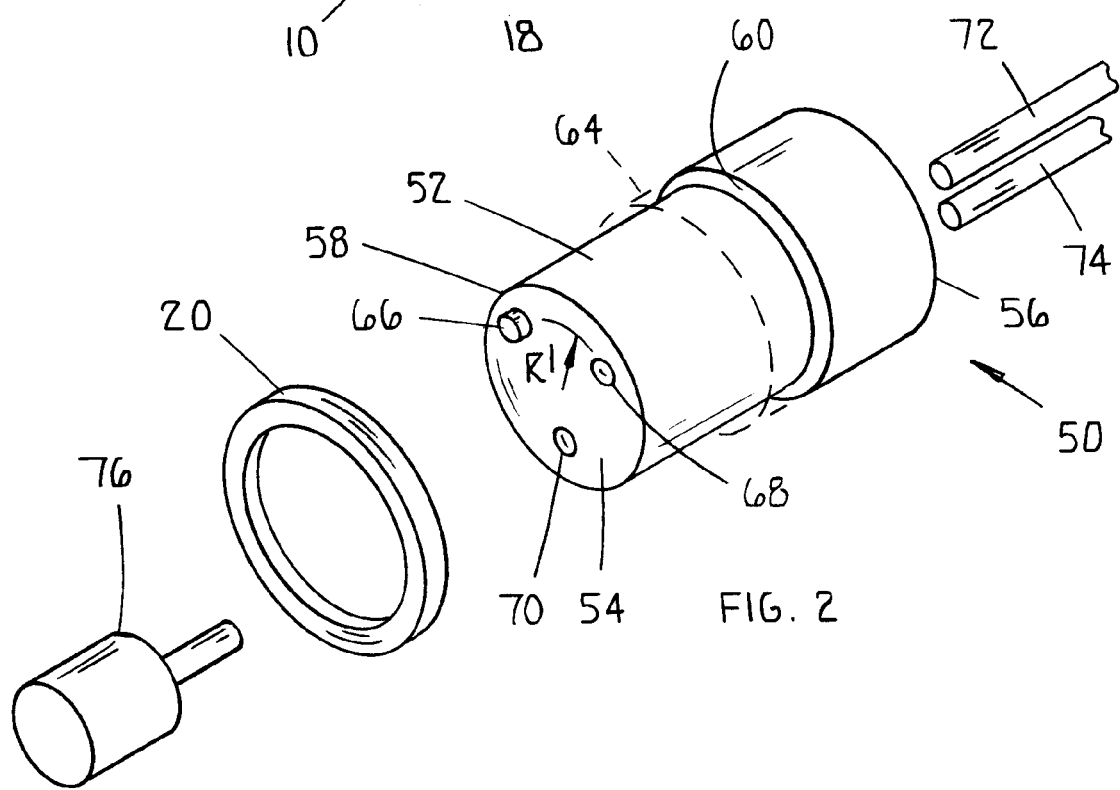
FIG. 2 is an exploded view of a tool for installing the seal of FIG. 1 in the groove of the housing.

FIG. 1 is a perspective view of a housing 10 with a cylindrical bore 12 therein having a diameter $D^1$ and a groove 14 located a fixed distance "$L^1$" from a first end 16 and a seal 20. The bottom 18 of the groove 14 has a diameter $D^2$ while the seal 20 is defined by a ring having an peripheral diameter $D^3$ and an axial diameter $D^4$ and wherein the peripheral diameter $D^3$ is substantially equal the diameter $D^2$ of the bottom 18 of groove 14 and the axial diameter $D^4$ is smaller than the diameter $D^1$ of the cylindrical bore 12 such that when a piston is inserted in the cylindrical bore 12, a radial seal is produced. The distance $L^1$ can vary in housing 10 and when groove 14 is more that a predetermined distance from end 16, a seal 20 may be twisted during installation such that when a piston is located in cylindrical bore 12 the seal may be damaged. To prevent the occurrence of twisting during installation it is desirable to utilize a tool 50 as illustrated in FIG. 2 to position a seal 20 in cylindrical bore 12 according to the method of the present invention.

Tool 50 is defined by a cylindrical body 52 having a first end 54 and a second end 56 with a first diameter 58 that corresponds to diameter $D^1$ of cylindrical bore 12 that extends from the first end 54 to a shoulder 60 and a second diameter 62 that extends from shoulder 60 to the second end 56. The distance from the first end 54 to shoulder 60 is equal to the distance $L^1$ but may be adjusted through the use of a spacer 64 (shown in dashed lines) to account for a different location of groove 14 from end 16 of housing 10. Tool 50 has an axial projection 66 that extends from end 54 and a plurality of axial bores 68 and 70 that extends there through from the first end 54 to the second end 56. The axial projection 66 and axial bores 68 and 70 are located in a same radius $R^1$ about the axis of the cylindrical body 52. Tool further includes a first pin 72 that is associated with the first axial bore 68, a second pin 74 that is associated with the second axial bore 70 and a third pin 76. When a seal 20 is placed in a bore 12 of a housing 10 a first step is to determine a distance $L^1$ that a groove 14 is from an end 16 of the housing 10. If the distance $L^1$ for a tool 50 is different from the distance $L^1$ for housing 10 a spacer 64 would be placed on diameter 58 so that the distances $L^1$ are identical, in the following steps we will assume that the distances $L^1$ are equal. A seal 20 is located on the axial projection 66 and the first pin 72 is inserted in the first axial bore 68 such that an end 71 thereon extends past the end 54 of the cylindrical body 52 and the seal 20 as illustrated in FIG. 3.

The third pin 76 is brought into alignment with tool 50 adjacent the first diameter 58 and moved in a radial direction toward the cylindrical body 52 to engage seal 20 and applying a radial force to cylindrical seal 20 to deform the cylindrical seal 20 with respect to projection 66 and end 71 of first pin 72 into an approximate C-shape as illustrated in FIG. 4. The now C-shape cylindrical seal 20 has an overall dimension that is smaller than a diameter 58 of the cylindrical body 52, see FIG. 5 and as a result would not engage the cylindrical bore 12 during insertion into groove 16. The third pin 76 is initially inserted into the second axial bore 70 to retain the cylindrical seal 20 in the C-shape until the second pin 74 is inserted in the second axial bore 70 and an end 75 thereon extends past the first end 54 of the cylindrical body 52 to push the third pin 76 out of the second axial bore 70 and engage the cylindrical seal 20 and maintain the C-shape cylindrical seal 20 on the end of tool 50 as illustrated in FIG. 6. For some applications, it may be desirable to include a flat 73 only shown in drawing 6 on pin 72 that would engage a corresponding indentation or stop 53 on cylindrical body 54 to define a locking arrangement to assure that the first 72 and second 74 pins remain in a fixed location during a later insertion into bore 12 of housing 10.

The tool 50 with the C-shape cylindrical seal 20 on the end thereof is inserted into cylindrical bore 12 of housing 10 until rib or shoulder 60 on tool 50 engages end 16 to radially align the C-shape cylindrical seal 20 with groove 14, see FIG. 7. When the C-shape cylindrical seal 20 is aligned with groove 14, the first 72 and second 74 pins are retracted from the cylindrical body 52 such that the cylindrical seal 20 resiliently expands from the C-shape to a circular shape to fill groove 14 as illustrated in FIG. 8. In some installations, it may be desirable to assist in the seating of the seal 20 in groove 14 and this can be achieved by rotating the cylindrical body 52 in bore 12 to compress the seal 20 in groove 14 by projection 66. Thereafter, the cylindrical body 54 is removed from cylindrical bore 12 to complete the installation of the installation of the seal 20 in housing 10. Thus, seal 20 has been positioned in groove 14 without any twisting such that a piston may now be inserted into cylindrical bore 12 and engage seal 20 without damage to seal 20.

I claim:

1. A method of positing a seal in a groove in an axial bore of a housing comprising the steps of:

initially placing a cylindrical seal on a projection that extends from a first end of a cylindrical body of a tool, said tool having first and second axial bores that located in an arcuate plane with respect to the axis of said cylindrical body and extending from said first end to a second end of said cylindrical body;

inserting a first pin in said first axial bore such that an end thereon extends past the first end of said cylindrical body and said cylindrical seal;

applying a radial force to said cylindrical seal to deform said cylindrical seal with respect to said projection and said end of first pin into an approximate C-shape, said C-shape cylindrical seal having an overall dimension that is smaller than a diameter of said cylindrical body;

inserting a second pin in said second axial bore such that an end thereon extends past the first end of said cylindrical body to retain said cylindrical seal in said C-shape;

inserting said cylindrical body with said cylindrical seal with said C-shape into said axial bore of said housing until said cylindrical seal is in radial alignment with said groove;

removing said first and second pins from said cylindrical body such that said cylindrical seal resiliently expands from said C-shape to a circular shape to fill said groove; and retracting said cylindrical body from said axial bore to complete the installation of the seal in the housing.

2. The method as recited in claim 1 wherein the step of inserting the cylindrical body into the axial bore includes:

bringing a lip on said cylindrical body into engagement with said housing to radial align the cylindrical seal with the C-shape with said groove.

3. The method as recited in claim 2 further including a step of locating a spacer on said cylindrical body if necessary to achieve radial alignment of the cylindrical seal with the C-shape with said groove.

4. The method as recited in claim 1 wherein said step of applying a radial force to deform said cylindrical seal is achieved by radially moving an axial third pin until said third pin is in axial alignment with said second axial bore and then axially moving said third pin into said second axial bore to establish said C-shape in said cylindrical seal.

5. The method as recited in claim 1 wherein said step of inserting a second pin in said second axial bore includes the additional step of:

engaging said third pin to move said third pin out of said second axial bore and bringing said second pin into engagement with said cylindrical seal to maintain said C-shape therein.

6. The method as recited in claim 1 wherein said step of removing said pins from said cylindrical body further includes the additional step of:

rotating said cylindrical body to assist in the seating of said cylindrical seal in said groove.

7. The method as recited in claim 1 said step of:

locking said first and second pins with respect to said cylindrical body to maintain said first ends thereof in a fixed location during the insertion into said cylindrical body.

8. A method of positioning a seal in a groove of a bore in a housing comprising the steps of:

placing a cylindrical seal on a plurality of projections that extend from a cylindrical body;

radially moving at least one of the projections to deforming the cylindrical seal into a C-shape;

inserting the cylindrical body into the bore until in the deformed cylindrical seal is in radial alignment with the groove; and axially retracting at least the one projection to allow the cylindrical seal to radially expand from the C-shape to a circular shape and fill the groove to complete the location in the housing.

* * * * *